No. 700,415. Patented May 20, 1902.
J. F. GAIL.
AUTOMATIC BRAKE AND POWER SHIFTING MECHANISM.
(Application filed Aug. 28, 1901.)
(No Model.) 2 Sheets—Sheet 1.
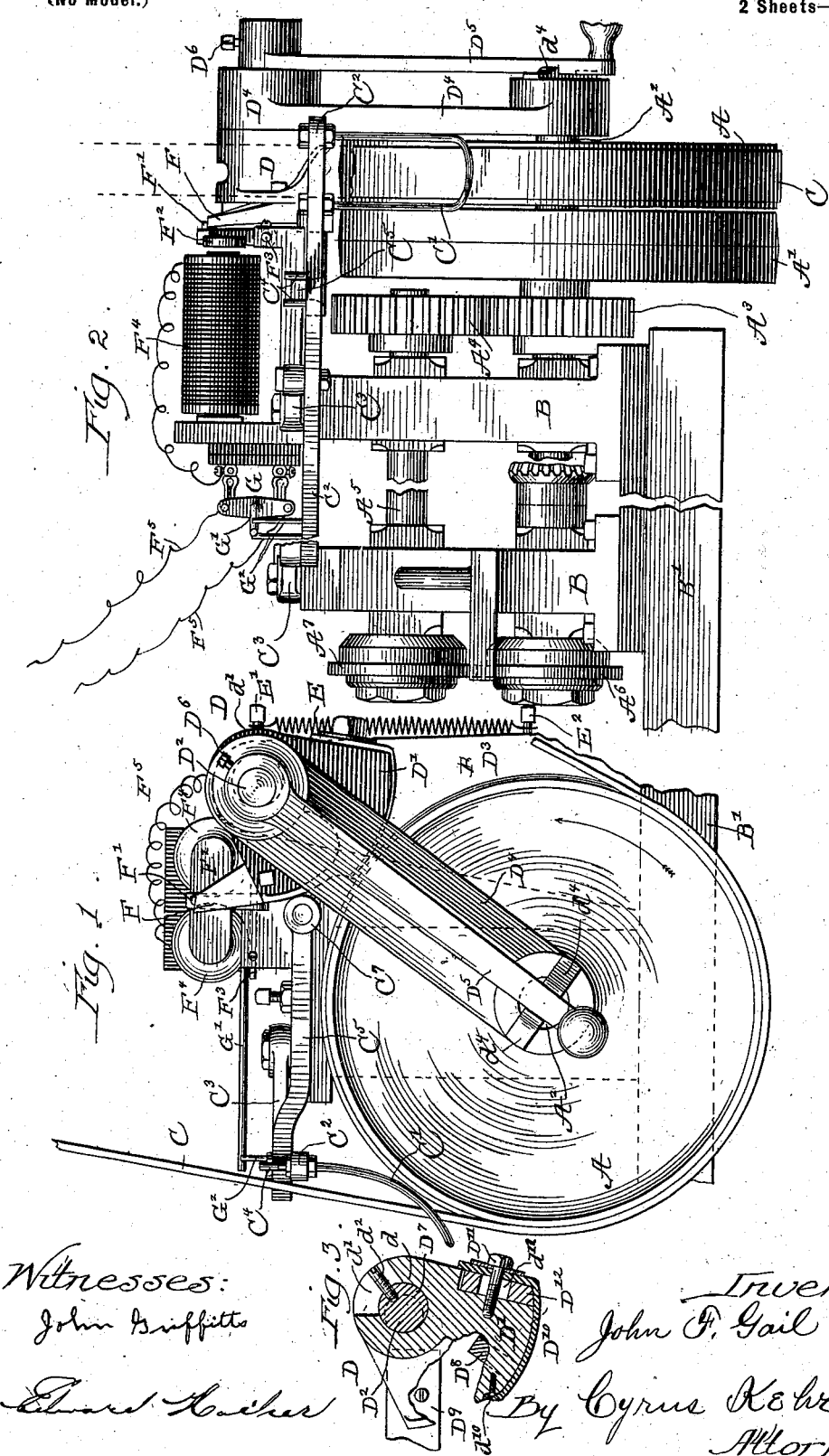
Witnesses:
John Griffitts
Edward Hacker
Inventor:
John F. Gail
By Cyrus Kehr
Attorney.
THE NORRIS PETERS CO., PHOTO-LITHO., WASHINGTON, D. C.

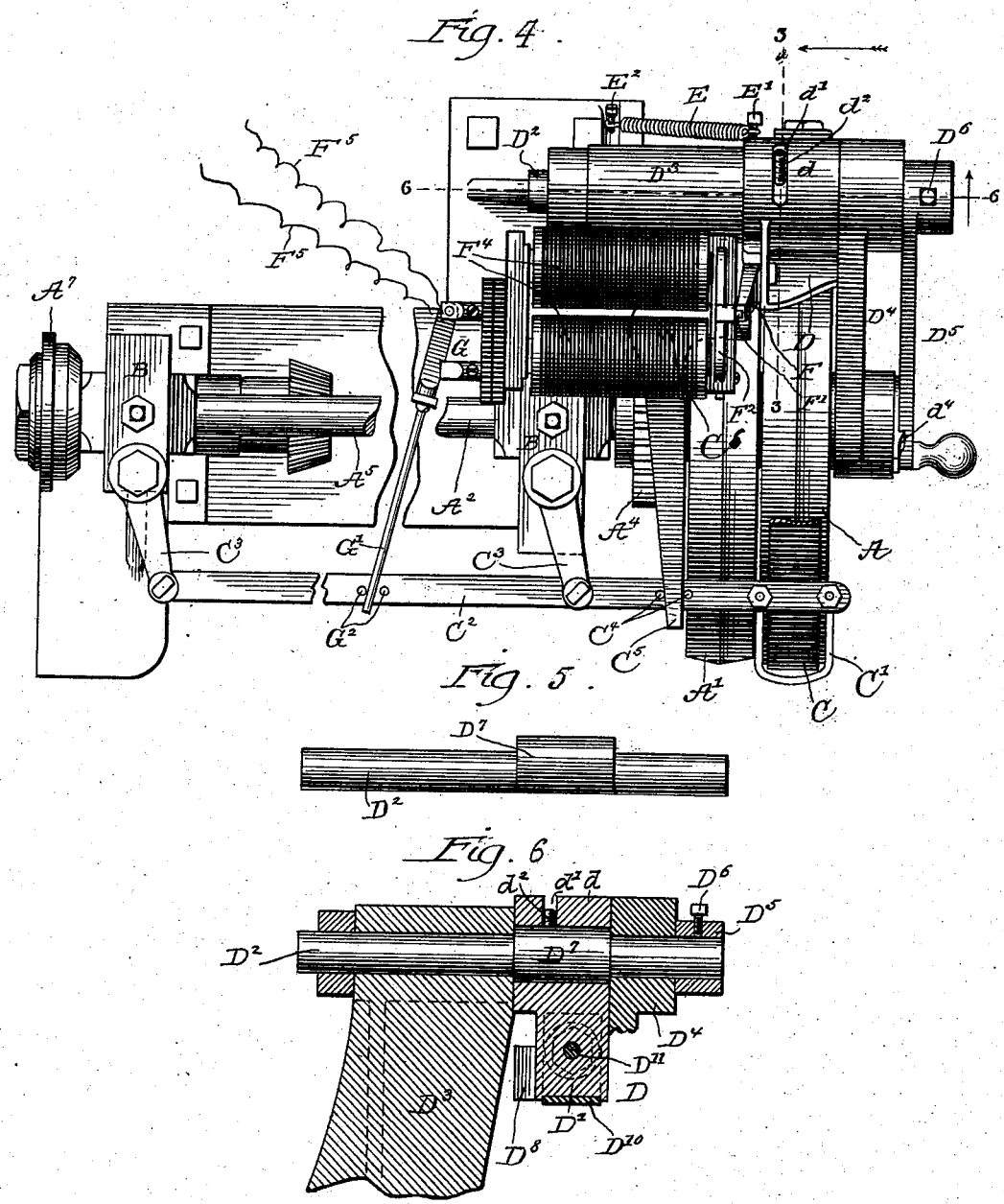

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

AUTOMATIC BRAKE AND POWER-SHIFTING MECHANISM.

SPECIFICATION forming part of Letters Patent No. 700,415, dated May 20, 1902.

Application filed August 28, 1901. Serial No. 73,563. (No model.)

*To all whom it may concern:*

Be it known that I, JOHN F. GAIL, a citizen of the United States, residing at Kenosha, in the county of Kenosha and State of Wisconsin, have invented certain new and useful Improvements in Automatic Brake and Power-Shifting Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to mechanism for shifting a driving-belt from a driving wheel or pulley to a loose or idle wheel or pulley located beside said driving-pulley and to brake mechanism for stopping the rotation of said driving-pulley immediately upon the removal of said belt, to the end that the machinery operated by said driving-belt may be quickly stopped when said power-belt has been removed.

As herein described, the brake mechanism is normally held out of action by a stop operating against a spring tending to move said brake into action. The releasing of said stop allows said spring to act. The movement of said brake mechanism while going into action actuates the belt-shifting mechanism.

It will be understood that a clutch might be employed instead of the belt-pulleys and the belt-shifting mechanism arranged to shift the movable member of the clutch. It will also be understood that the brake might be applied to any suitable periphery arranged in working relation with the power-shaft, and the power-shaft may be regarded as any shaft which is used to transmit power, whether to an entire machine or only to a portion of a machine.

It is obvious that a weight might be used as a substitute for the spring employed for moving the brake into action.

In practice I have applied my improvement to an automatic machine for making coiled-wire fabric for bed-bottoms, said machine embodying mechanism for forming the coils, mechanism for delivering the wire to said coil-forming mechanism, mechanism for receiving the finished coil, mechanism for severing each coil when completed, and mechanism for shifting the fabric after the completion of each coil. In the operation of such machines it is of great importance that the machine be promptly stopped whenever there is abnormal action in any one of the various groups of mechanism of which said machine is composed. If said machine is not promptly stopped when there is such abnormal action, there is a loss of wire and disarrangement of the fabric and clogging of the machine to an objectionable degree. The loss of wire is a material loss, and the undoing of all that has gone wrong subsequent to the beginning of the abnormal action frequently requires the stopping of the machine during a considerable period of time. These wire-coiling machines are referred to merely as an illustration of machines to which my improvement may be applied. The machine may be for any other kind of work which requires application of power and which should be stopped promptly when the work to be done by the machine is completed or when the operation of the machine becomes abnormal.

In the accompanying drawings, Figure 1 is an end elevation. Fig. 2 is a front elevation of the same mechanism. Fig. 3 is a section on line 3 3 of Fig. 4 looking in the direction of the arrow. Fig. 4 is a plan of the mechanism shown by Figs. 1 and 2. Fig. 5 is a detail of the shaft upon which the brake is mounted. Fig. 6 is a vertical section on line 6 6 of Fig. 4 looking in the direction of the arrow.

In said drawings, A is a power-pulley. A' is a loose or idle pulley. $A^2$ is the power-shaft. This is journaled in the columns B B, rising from the base B'. Between said loose pulley and the adjacent column B is a spur gear-wheel $A^3$, which meshes into a corresponding gear-wheel $A^4$, seated on a shaft $A^5$, journaled in said columns parallel to said power-shaft $A^2$. At the left of the left-hand column B said power-shaft supports a roller $A^6$, and immediately above said roller said shaft $A^5$ supports a corresponding roller $A^7$, said rollers being of proper diameter to bring their peripheries into contact and being intended to be used for driving wire into the coil-forming dies of a wire-coiling machine or for any other similar work.

C is the belt.

$C'$ is a yoke extending around the belt. $C^2$ is a horizontal bar which supports said yoke. $C^3$ $C^3$ are horizontal parallel links hinged to said bar and the columns B B on vertical axes, so that said bar may be shifted endwise in a horizontal plane, whereby the yoke $C'$ is carried from one pulley to the other. As is well known, the tendency of such a pulley-belt is to remain upon the pulley to which it has been shifted, so that usually no mechanism need be employed to retain said belt in position on either of said pulleys. At the right of the right-hand column B two pins $C^4$ stand upon the bar $C^2$. Between said pins lies one arm of a bell-crank $C^5$, which is suitably hinged at $C^6$ on a vertical axis. The other arm of said bell-crank extends horizontally to the right over the loose pulley $A'$ and there supports an antifriction-roller $C^7$. When the brake-shoe, to be hereinafter described, goes into action, it presses against said antifriction-roller $C^7$, whereby said bell-crank is turned upon its hinge, the arm lying between the pins $C^4$ $C^4$ is moved toward the left, said arm bearing against the pin $C^4$ at the left and through said pin forcing the bar $C^2$, the yoke $C'$, and the belt C to the left, the relative lengths of the arms of the said bell-crank being such as to cause the bar $C^2$ to move just far enough to shift the belt from the pulley A to the loose pulley $A'$.

D is the brake.

$D'$ is the shoe of the brake. $D^2$ is a shaft extending loosely through the hub $d$ of said brake D. Said shaft is parallel to the power-shaft $A^2$ and is located above and a little to the rear of the pulleys A and $A'$ and has one end rotatably secured in the standard $D^3$, located at the left of said brake. At the right of said brake said shaft $D^2$ extends through one end of the arm $D^4$ and the other end of said arm surrounds the power-shaft $A^2$. Said shaft $D^2$ extends to the right of the arm $D^4$ sufficiently to receive a crank $D^5$, which crank is rigidly secured to said shaft, as by a set-bolt $D^6$. Within the brake D the shaft $D^2$ has the eccentric portion $D^7$, the axis of such eccentric portion being at the rear of the axis of the main portion of the shaft $D^2$. A radial slot $d'$ extends through the upper portion of the hub $d$, and within said slot a set-screw $d^2$ is fixed radially in the shaft $D^2$. The purpose of said slot and set-screw is to limit the rotation of the brake upon the shaft $D^2$, as will be readily understood by an inspection of the drawings.

E is a contracting-spring attached by its upper end to the rear portion of the brake-hub, as by means of a screw-bolt $E'$, and by its lower end to the base of the standard $D^3$ by a screw-bolt $E^2$. The tendency of said spring is to turn the rear portion of the hub of the brake downward and to turn the brake-shoe forward and upward.

The rear lower portion or heel of the brake-shoe (the working face or that which is to make contact with the periphery of the power-pulley) is eccentric, (the rearmost portion being the farther from the axis of the brake,) and the location of the brake is such as to bring the forward end of said working face almost into contact with the periphery of the power-pulley when the brake is in its normal position, and said eccentricity of the brake is sufficient to cause it to bind firmly upon said pulley when the brake-shoe is moved forward and upward, the portion of the brake between its support or abutment and said periphery being of increasing thickness, whereby the brake is adapted to wedge between its support or abutment and said periphery.

The working face of the brake may be covered with any suitable material adapted to make effective engagement with the periphery of the power-pulley and which may be replaced when worn out. $D^{10}$ is a sheet of such material secured at its front end by a screw $d^{10}$ and at the rear by the screw $D^{11}$. If so desired, an adjustable block $D^{12}$, having a vertical slot $d^{12}$ through which the screw $D^{11}$ passes, may be interposed between said sheet and the brake. When the brake is to bear with greater force upon the power-pulley, said block may be set lower, or if the heel of the brake is found to extend too far on the axis of the brake said block may be moved slightly upward. Said pulley rotates in the direction of the arrow, and since it makes contact with said brake the latter is carried forward by said pulley with a force greater than could be exerted by the spring E alone, and by reason of the eccentricity of the brake the said shoe becomes wedged between the periphery of said pulley and the shaft $D^2$. The forward and upward movement of the brake is limited by a lug $D^8$, located on said brake, meeting a stationary stop $D^9$, suitably secured, as upon the standard $D^3$.

The outer end of the crank $D^5$ is detachably secured in any suitable manner. The drawings show it so secured between two lugs $d^4$ $d^4$ on the portion of the arm $D^4$ adjacent to the shaft $D^2$. Said crank is sufficiently flexible to allow it to be sprung to the right out of the space between said lugs. When said crank has been thus released, it may be turned to partially rotate the shaft $D^2$ and release the brake by moving the axis of the latter, which is the axis of the eccentric $D^7$, away from the power-pulley.

At the left-hand front portion of the brake a finger F extends upward adjacent to an armature $F^2$, which is hinged at $F^3$. From said armature a projection $F'$ extends to the right in suitable position to stand above the upper end of said finger when the brake has been turned downward and rearward out of engagement. The spring E, as already described, tends to draw said brake forward and upward. The projection F' forms a stop against such forward movement, and the brake is thereby held out of engagement, notwithstanding the action of the spring E, until the engagement between the finger F and the projection F' ceases. This occurs when the armature $F^2$ turns toward the left upon its hinge. A pair of electromagnets $F^4$, set at the left of said armature, shift the latter upon its hinge when the electric circuit in which said magnets are located and of which the wires $F^5$ $F^5$ form a part is closed, and said magnets energized by the current then going through said circuit. When the finger F is thus released from the projection F', the brake is free to rotate in response to the tension of the spring E, and said brake moves forward until it makes contact with the periphery of the power-pulley, and it is then carried forward by the force of said pulley (so far as said force is transmitted to said pulley by friction) added to the force of said spring. As already described, said brake-shoe is eccentric, its heel being the farther from the axis, so that said brake becomes wedged more and more between the pulley and the shaft $D^2$ until the resistance offered by the brake becomes sufficient to stop the power-pulley or until the lug $D^8$ meets the stop $D^9$. The portion of the brake forward of said working face recedes toward the axis of the brake sufficiently to make room for the antifriction-roller $C^7$ on the bell-crank $C^5$. When the brake-shoe moves forward, said roller is pressed outward or forward by the working face of said brake-shoe, whereby said bell-crank is rotated upon its hinge and made to carry the bar $C^2$ and the yoke C' and belt C to the left, said belt passing from the pulley A to the loose pulley A'. An attendant may apply the brake and shift the belt in the same manner by manually pushing the armature $F^2$ to the left. If it is desired to shift the belt without applying the brake, the bar $C^2$ may be shifted manually.

As already stated, the belt-shifter and brake mechanism are drawn into action when the electric circuit upon which the electromagnets are located is closed. In order that all the mechanism may be readily put back into normal position, said electric circuit should be again broken when the machine is stopped. It will be observed that it would be inconvenient to reset the brake and hold it with the armature $F^2$ without first deënergizing the electromagnets.

G is a switch or circuit-breaker located at the left of the electromagnets. Said circuit-breaker is made an automatic means for breaking the circuit after it has been closed by circuit-closing devices operating manually or automatically for the stopping of the machine. Said circuit-breaker has a handle G', which extends between two pins $G^2$ $G^2$, rising from the bar $C^2$. The relative arrangement of these parts is such that when the yoke C' stands in front of the power-pulley the circuit-breaker G will make contacts to close the circuit and that when the bar $C^2$ is shifted to the left to move the yoke C' to the left, so as to stand in front of the loose pulley A', the hinge of such circuit-breaker will be moved to the left sufficiently to cause said circuit-breaker to break contacts.

It is to be observed that the bell-crank $C^5$ is not coupled to the brake. Hence the latter may be reset independently of the belt-shifting mechanism. After the brake has been reset, the circuit reopened where it has been closed for the stopping of the machine, and the machine has been in other respects made ready for the renewal of its operation the bar $C^2$ may be manually shifted to the right, whereby the belt is again shifted to the power-pulley, and the arm of the circuit-breaker is turned to the right and the circuit again closed at this point. The arm of the circuit-breaker may be sprung upward out of engagement with the bar $C^2$ and operated manually.

The electric mechanism for controlling the brake and the power-shifting mechanism may obviously be so modified as to keep the circuit normally closed.

I claim as my invention—

1. The combination with a shaft and a wheel fixed immovably upon said shaft, of mechanism for applying power to said wheel, mechanism for shifting said last-mentioned mechanism, and a brake normally held out of engagement with a periphery which is in working relation with said shaft and arranged to actuate said shifting mechanism when said brake moves into action, the portion of said brake between its support and said periphery being of increasing thickness, substantially as described.

2. The combination with a shaft and a power-pulley and an idle pulley mounted upon said shaft, of belt-shifting mechanism and brake mechanism normally held out of engagement with said power-pulley, and adapted to actuate said belt-shifting mechanism when said brake mechanism moves into action, the portion of said brake between its support and said periphery being of increasing thickness, substantially as described.

3. The combination with a shaft and a wheel fixed immovably upon said shaft, of mechanism for applying power to said wheel, mechanism for shifting said last-mentioned mechanism, and a brake normally held out of engagement with a periphery which is in working relation with said shaft and arranged to actuate said shifting mechanism when said brake moves into action, and electric mechanism for releasing said brake, substantially as described.

4. The combination with a shaft and a power-pulley and an idle pulley mounted upon said shaft, of belt-shifting mechanism and brake mechanism normally held out of engagement with said power-pulley, and arranged to actuate said belt-shifting mechanism when said brake mechanism moves into action, and electric mechanism for releasing said brake, substantially as described.

5. The combination with a shaft and a wheel fixed immovably upon said shaft, of mechanism for applying power to said wheel, mechanism for shifting said last-mentioned mechanism, and a brake normally held out of engagement with a periphery which is in working relation with said shaft and arranged to actuate said shifting mechanism when said brake moves into action, the portion of said brake between its support and said periphery being of increasing thickness, and means for manually shifting the support of said brake mechanism away from said periphery, when said brake is to be reset, substantially as described.

6. The combination with a shaft and a power-pulley and an idle pulley mounted upon said shaft, of belt-shifting mechanism and brake mechanism normally held out of engagement with said power-pulley, and adapted to actuate said belt-shifting mechanism when said brake mechanism moves into action, the portion of said brake between its support and said periphery being of increasing thickness, and means for manually shifting the support of said brake mechanism for the purpose of releasing and resetting said brake, substantially as described.

7. The combination with a shaft and a wheel fixed immovably upon said shaft, of mechanism for applying power to said wheel, mechanism for shifting said last-mentioned mechanism, and a brake normally held out of engagement with a periphery which is in working relation with said shaft and adapted to actuate said shifting mechanism when said brake moves into action, and electric mechanism for releasing said brake, and means for manually shifting the support of said brake mechanism away from said periphery, when said brake is to be reset, substantially as described.

8. The combination with a shaft and a power-pulley and an idle pulley mounted upon said shaft, of belt-shifting mechanism and brake mechanism normally held out of engagement with said power-pulley, and arranged to actuate said belt-shifting mechanism when said brake mechanism moves into action, and electric mechanism for releasing said brake, and means for manually shifting the support of said brake mechanism for the purpose of releasing and resetting said brake, substantially as described.

9. The combination with a wheel or pulley, A, of an eccentric brake, a relatively fixed shaft supporting said brake, a spring tending to move said brake into action, an armature making suitable engagement with said brake for holding the latter out of action against the force of said spring, and electromagnets for shifting said armature, and a belt-shifter located in suitable relation to said brake to be actuated when the latter moves into action, substantially as described.

10. The combination with a shaft, $A^2$, and a fixed and a loose pulley located thereon, of a belt-shifting mechanism comprising a bell-crank, and a brake having a shoe held normally out of engagement with said power-pulley and placed in suitable relation with one arm of said bell-crank to actuate the latter when said brake-shoe is moved into action, substantially as described.

11. The combination with power-shifting mechanism and brake mechanism arranged in suitable relation to each other, of electric mechanism for controlling said brake mechanism, and an automatic switch for reversing the condition of said electric mechanism, after said shifting mechanism and said brake mechanism have been actuated, substantially as described.

12. The combination with power-shifting mechanism and brake mechanism arranged in suitable relation to each other, of electric mechanism for controlling said brake mechanism, and an automatic switch for breaking the circuit upon which said electric mechanism is located, after said power-shifting mechanism and said brake mechanism have been actuated, substantially as described.

13. The combination with the belt-shifting mechanism comprising the yoke, C', bar, $C^2$, and links, $C^3$, of a brake, a suitable connection between said brake and said bar, and electric mechanism for controlling said brake, and an electric switch suitably coupled to said belt-shifting mechanism, substantially as described.

In testimony whereof I affix my signature, in presence of two witnesses, this 7th day of August, in the year 1901.

JOHN F. GAIL.

Witnesses:
  CHAS. VOIGHT,
  RAY SWIFT.